(No Model.)
A. MONTANT.
SUPPORTING DEVICE FOR TRUNKS, DESKS, &c.
No. 272,459.                     Patented Feb. 20, 1883.
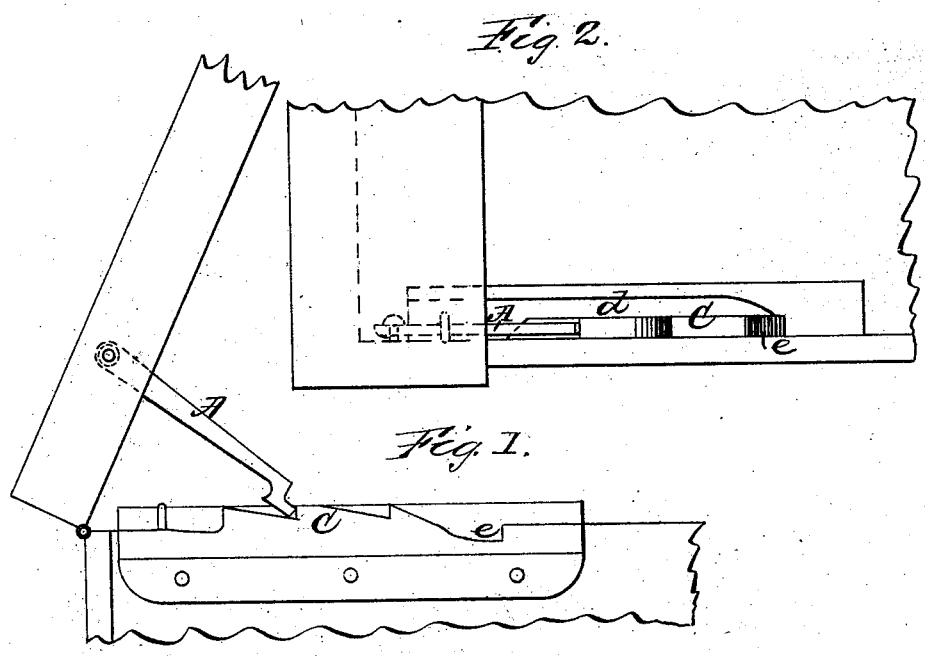
WITNESSES:
INVENTOR
Alphonse Montant
BY W. L. Bennom
ATTORNEY

UNITED STATES PATENT OFFICE.

ALPHONSE MONTANT, OF NEW YORK, N. Y.

SUPPORTING DEVICE FOR TRUNKS, DESKS, &c.

SPECIFICATION forming part of Letters Patent No. 272,459, dated February 20, 1883.

Application filed November 26, 1881. (No model.)

*To all whom it may concern:*

Be it known that I, ALPHONSE MONTANT, of the city, county, and State of New York, have made certain new and useful Improvements in Automatic Supporting Devices for Desks, Trunks, Tables, &c.; and I do hereby declare that the following, when taken in connection with the drawings, is a full, clear, and exact description and specification of the same.
The object of my invention is to apply to the lid of boxes, trunks, school-desks, show-cases, or to anything with which a support or catch is used, an automatic supporting device.

The said improvements consist in a supporting-arm, one end of which is loosely attached to the lid of a desk, the other acts directly on a rack attached to the body of the desk for the purpose of holding up the lid at any height. On the side of the rack is a groove, in which, when the lid is raised at a certain height, the end of the arm falls. This groove is continued alongside of the rack its entire length, so that when the end of the arm is in the groove, if the lid is lowered, the arm will slide in it until it reaches the farthest end, when it falls in a hollow in front of the rack, and is consequently in a position to again slide on the rack and engage with the teeth when the lid is again raised.
Figure 1 represents a fragmentary portion of a trunk with my improvements applied thereto, lid of trunk being partially raised. Fig. 2 represents a plan of the same.

In the drawings, the arm A acts directly on the rack C, the return motion being effected by the end of the arm A falling into a groove, $d$. Said groove is continued on the side of the rack C, and at the very end of the groove again falls into a hollow, $e$, which has an abrupt side toward the groove $d$, but is inclined toward the rack, so that when the lid is raised the arm again runs on the ratchet bar or rack.

To suit different purposes a slight change of manufacture can be made without departing from the general principle of a return motion in a groove, the return motion over the rack being prevented by the fall of the arm in a hollow having an abrupt side toward the rack.

What I claim as my invention, and desire to secure by Letters Patent, is—

1. The combination of a supporting-arm with a stationary rack and a groove or way by which the arm returns automatically to a position in front of the rack, substantially as specified.

2. The combination of the arm A with the rack C, constructed as shown, the groove $d$, and hollow $e$, substantially as set forth.

Witness my hand this 24th day of November, A. D. 1881.

ALPHONSE MONTANT.

Witnesses:
W. L. BENNEM,
G. M. BARRETTO.